Jan. 18, 1927.
T. H. OPPENHEIM ET AL
1,615,097
GEARING
Filed Sept. 24, 1925  2 Sheets-Sheet 1
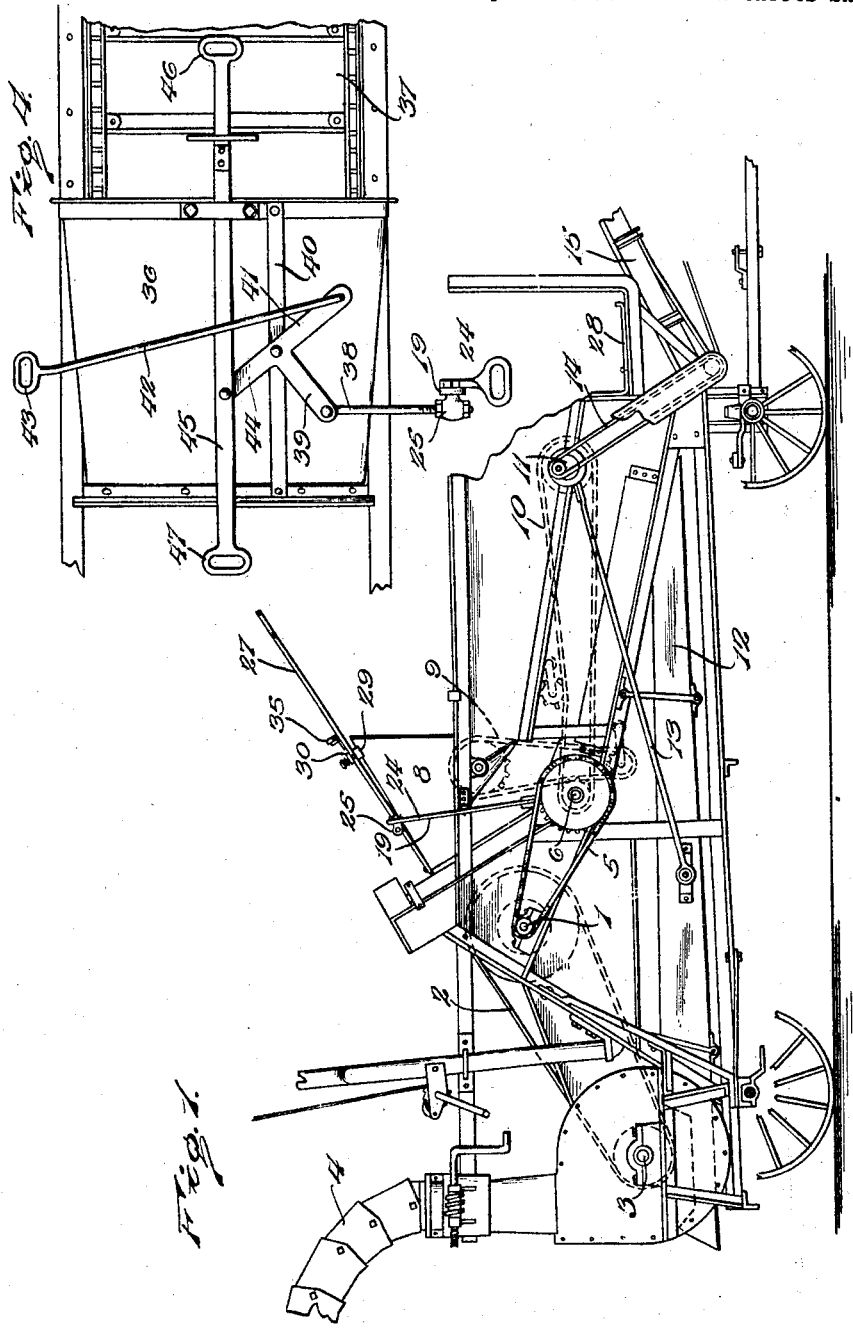
Inventor
T. H. Oppenheim
Bernard Selhorst
By
Lacey & Lacey, Attorneys Jan. 18, 1927.
T. H. OPPENHEIM ET AL
1,615,097
GEARING
Filed Sept. 24, 1925    2 Sheets-Sheet 2
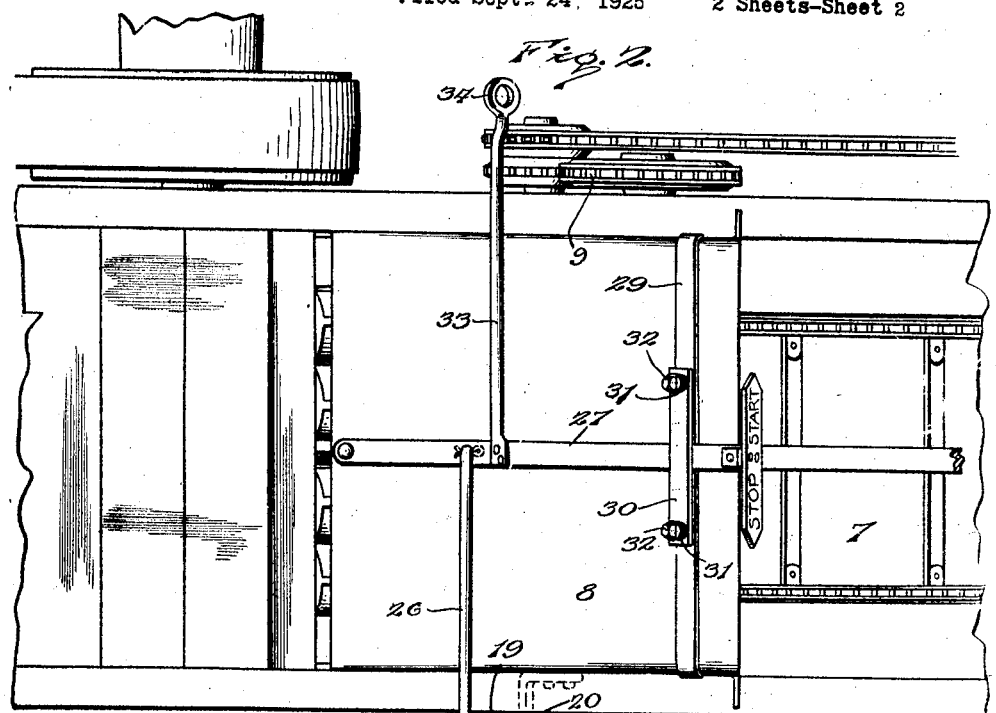
Inventors
T. H. Oppenheim
Bernard Selhorst
By Louy Houy, Attorney Patented Jan. 18, 1927.

1,615,097

UNITED STATES PATENT OFFICE.

THEODORE H. OPPENHEIM AND BERNARD SELHORST, OF COLDWATER, OHIO, ASSIGNORS TO THE NEW IDEA SPREADER CO., OF COLDWATER, OHIO, A CORPORATION OF OHIO.

GEARING.

Application filed September 24, 1925. Serial No. 58,428.

Our present invention relates to the means for operating the driving elements of portable machines and has for its object the provision of means whereby all or substantially all of the working elements of the machine may be stopped in an emergency to avoid damage to the machine or injury to the workmen. The invention is illustrated in the accompanying drawings and will be hereinafter fully set forth.

In the drawings:

Figure 1 is a side elevation of a cornhusking machine having our invention applied thereto;

Fig. 2 is an enlarged plan view of that portion of the machine embodying the invention;

Fig. 3 is a view partly in front elevation and partly in vertical transverse section, and Fig. 4 is a plan view showing an embodiment of the invention differing somewhat from that shown in Figs. 1, 2 and 3.

The corn-husking machine includes a main shaft 1 which carries a cutter head and is driven at high speed through belt connections (not shown) with a tractor or other prime motor. On one side of the machine the cutter shaft is connected by belt or chain gearing, indicated at 2, with a blower shaft 3 carrying a fan whereby the waste material is driven out through a discharge spout, indicated at 4. On the opposite side of the machine the cutter shaft 1 is connected through chain or belt gearing 5 with a counter-shaft 6 connected through suitable gearing within the frame of the machine with the snapping and husking rollers whereby all said rollers will be driven from the said shaft. In the upper part of the machine, there is a feeding conveyer, indicated at 7, on which the corn stalks with the ears attached are delivered and fed into a hopper 8 directly over the snapping rollers. This feeding conveyer is operated through gearing, indicated at 9, which receives motion through a sprocket wheel carried by one end of the counter-shaft 6, and gearing, indicated at 10, also connects the said shaft 6 with a cam shaft 11 near the front end of the machine, the said cam shaft actuating a shaker screen 12 through pitmen 13 and being also connected by chain gearing 14 with an ear conveyer 15 whereby the cleaned ears of corn are carried to a bin or other place of deposit. The several trains of gearing are all enclosed in gear cases and the cutter shaft 1 and the blower shaft 3 are further protected and housed by the main frame or casing of the machine. The snapping and husking rollers, however, are not entirely enclosed and it frequently happens that wrenches or other tools become lost in the supply of corn or are accidentally dropped onto the feeding conveyer and carried by it to the rolls so that considerable damage is caused to the several working parts. While the machine is designed to prevent contact of the operators with any of the working parts, nevertheless, it frequently happens that through carelessness or accident an attendant falls upon the feeding conveyer or approaches too closely to some of the driving chains and his clothing becomes entangled therewith. In such events, it is desirable to stop the operation of the machine instantly, and the particular object of the present invention is to provide simple means whereby the operation of the working parts may be instantly arrested by an operator at either side of the machine or at the front thereof.

The sprocket 16, whereby motion is imparted to the shaft 6 in the illustrated arrangement, is loose upon said shaft but its rim 17 forms one member of a clutch whereby the sprocket may be locked to the shaft so as to rotate the same, the cooperating clutch member being provided by a drum or disk 18 movable into or out of frictional engagement with the inner surface of the rim 17, as will be understood. To shift the clutch member 18, we provide a lever 19 which is disposed at the adjacent side of the husking machine and is fulcrumed between its ends upon a bracket 20 secured to and projecting laterally from the frame of the machine. The lower end of this lever is formed into or equipped with a fork 21 which has its ends engaged in an annular groove 22 in the hub member 23 of the clutch drum so that when the lever is rocked the clutch drum will be moved into or out of engagement with the rim 17. Near the upper end of the lever 19 there is formed thereon or secured thereto a handle 24 which may be easily grasped by an operator stationed at that side of the machine. The upper end of the lever is pivotally connected to a sleeve or collar 25 fitted upon the outer end of a link 26 which extends over the hopper 8 and has its inner end connected to a lever 27 which is pivoted at its rear end upon the hopper and projects forwardly beyond the same, as shown clearly in Fig. 1. This lever 27 is of such length that its front end may be easily grasped by an operator standing upon the platform 28 at the front end of the machine. The lever 27 slides upon a rail 29 which extends across the top of the hopper 8 and has its ends secured to the sides of the hopper, and, extending over the lever, is a friction plate 30 which is held yieldably to the rail by springs 31 coiled around bolts 32 inserted through the ends of the friction plate and through the rail at opposite sides of the lever, a constant friction being thus exerted upon the lever so that it will be held between the rail and the friction plate against accidental movement and the machine will not be caused to stop or to start prematurely but may be instantly started or stopped when necessary. An arm 33 is secured at its inner end to the lever 27 and extends laterally therefrom over the hopper to the side of the machine opposite that at which the lever 19 and the clutch are located. This arm 33 corresponds in form to the link 26 but instead of its outer end being pivotally connected with a rocking lever it is formed into or equipped with a handle 34 whereby it may be easily grasped when necessary.

From the foregoing description, taken in connection with the accompanying drawings, it will be readily seen that the opening and closing of the clutch involves a lateral movement of the lever 27 and in order that the operator may be positively informed at all times as to the direction in which the lever should be moved in order to start or stop the machine an indicator plate 35 is secured upon the lever 27 and at one side of its center bears the word "Stop" and at the other side of its center bears the word "Start", as shown in Figs. 2 and 3. Should it be necessary to stop the machine suddenly for any reason, it may be stopped from the front end of the machine or from either side, a pull upon the handle 24 or a push upon the handle 34 moving the parts in the same direction as a lateral shifting of the lever 27 toward the lever 19 and thereby rocking the lever 19 so that the clutch member 18 will be withdrawn from the clutch rim 17. Of course, when the clutch is thus opened, all the working parts will cease to operate, except the high speed shafts 1 and 3 and inasmuch as these shafts are not exposed to injury from objects carelessly or through accident left upon the feeding conveyer the continued rotation of these shafts does not tend to result in damage.

It will be noted that in the mechanism thus far described the stopping of the machine involves a pulling action at one side and a pushing action at the other side but as many persons prefer to have the same movement at both sides of the machine we have also provided the arrangement shown in Fig. 4. In Fig. 4, the hopper is designated by the reference numeral 36 and the feeding conveyer by the reference numeral 37, these parts corresponding in all respects to the similar parts in the previously described arrangement. The lever 19 shown in Figs. 1, 2 and 3 and hereinbefore described is adopted bodily in the form of the invention shown in Fig. 4 and is equipped with a handle 24 corresponding to the handle 24 in Figs. 1, 2 and 3. To the upper end of the lever 19 is pivotally connected, through a sleeve 25, a link 38 which is somewhat shorter than the link 26 shown in Figs. 2 and 3. The inner end of the link 38 is pivoted to one arm 39 of a three-armed lever which is fulcrumed at the junction of its several arms upon a bar 40 extending longitudinally of the hopper at one side of the center of the same. The arm 41 of the three-armed lever extends forwardly with respect to the arm 39 and a handle bar 42 is pivoted thereto and extends over the hopper to the opposite side of the machine from the link 38, the free end of this handle bar being formed into or equipped with a grip member 43. The third arm 44 of the three-armed lever extends rearwardly with respect to the arm 41 and in alinement with said arm and to the free end of the arm 44 is pivoted a push bar 45 which extends longitudinally over the hopper and projects beyond the respective ends of the same. Both ends of the push bar 45 are equipped with grip member 46 and 47 respectively so that this bar may be operated from either end. In this arrangement a pull upon either the handle 24 or the grip 43 will rock the three-armed lever in the proper direction to cause the lever 19 to open the clutch. A pull upon the rear end of the push bar 45 will obviously accomplish the same result but it will be necessary to push upon the front end of the bar 45 to open the clutch. The fact that the bar 45 must be pushed from its front end to open the clutch is, however, no detriment but, on the contrary, is an advantage inasmuch as if the operator normally standing upon the platform 28 should climb on top of the machine and then fall upon the feeding conveyer 37, he could stop the machine at once by merely grasping the grip member 46, whereupon the travel of his body with the feeding conveyer would effect a pushing of the bar 45 and open the clutch, thereby stopping the operation of the working parts.

From the foregoing description, it will be seen that we have provided an exceedingly simple mechanism whereby serious accidents will be easily avoided without interfering with the proper successful operation of the machine to strip husks from ears of corn in the usual manner. It may be added to what has been said that a side board, in actual practice, is provided at each side of the machine so that an operator may be supported upon the side of the machine as well as at the front end thereof if the exigencies of any particular set of circumstances should so require. It may also be noted that our corn-husking machine is so constructed that the top thereof is low compared with most corn-husking machines and the controlling handles may be reached from the ground in case of emergency and may be easily reached by a person standing upon a wagon at the side of the machine and engaged in transferring bundles of corn from the wagon to the husking machine.

It is to be understood that the drawings hereto annexed are illustrative only and not restrictive. The clutch and its cooperating parts may be applied without substantial change to the cutter or cylinder shaft 1 and opening of the clutch will then effect stoppage of all the working parts. While we have shown and described the invention as applied to a corn-husking machine, it may obviously be applied to other machines, such as clover-hullers or threshing machines, and is particularly desirable on all such types of farm machinery.

Having thus described the invention, we claim:

1. The combination with a machine frame, and a clutch, of a lever fulcrumed on one side of the frame and directly connected with the clutch, a main clutch-shifting member mounted on the frame and operable from the front of the same and connected with said lever, an actuating device operatively-connected with the clutch-shifting member and extending beyond the opposite side of the frame, and yieldable means on the frame bearing constantly on the main clutch shifting member to frictionally hold it in a set position.

2. The combination with a machine frame, and a clutch at one side of the frame, of a lever fulcrumed on the side of the frame and directly connected with the clutch, a main clutch-shifting member mounted on the frame and operable from the front thereof, a three-armed lever mounted on the frame and having one arm pivoted to the main clutch-shifting member, a link connecting another arm of said lever with the first-mentioned lever, and an operating rod pivoted to the third arm of the three-armed lever and extending therefrom to the opposite side of the machine frame.

In testimony whereof we affix our signatures.

THEODORE H. OPPENHEIM.
BERNARD SELHORST.